United States Patent [19]

Suganuma

[11] Patent Number: 5,485,160
[45] Date of Patent: Jan. 16, 1996

[54] RADAR-TYPE OBJECT SHAPE DETECTOR

[75] Inventor: Seishi Suganuma, Kamakura, Japan

[73] Assignee: Mitsubishi Denki Kabushiki Kaisha, Tokyo, Japan

[21] Appl. No.: 297,798

[22] Filed: Aug. 30, 1994

[30] Foreign Application Priority Data

Sep. 3, 1993 [JP] Japan .................................. 5-220066
Jun. 24, 1994 [JP] Japan .................................. 6-143448

[51] Int. Cl.$^6$ ..................................................... G01S 13/00
[52] U.S. Cl. ........................... 342/195; 342/194; 342/189
[58] Field of Search ........................... 342/195, 196, 342/197, 194, 200, 127, 128, 189; 364/561, 562, 563, 564

[56] References Cited

U.S. PATENT DOCUMENTS 5,129,044  7/1992  Kashiwagi et al. ..................... 395/86

FOREIGN PATENT DOCUMENTS 61-138188  6/1986  Japan .
63-50776   3/1988  Japan .
63-48486   3/1988  Japan .

*Primary Examiner*—Daniel T. Pihulic
*Attorney, Agent, or Firm*—Wolf, Greenfield & Sacks

[57] ABSTRACT

An apparatus is disclosed for detecting the shape of an object by means of radar. A transmitter 1 forms signal units wherein the transmitting frequency is varied continuously and linearly within a predetermined frequency bandwidth. By repeating this signal unit at fixed periods, a transmitting signal having a continuous waveform is generated. A receiver 5 detects signals reflected from a target 11, and converts them to video signals. An A/D converter 6 samples these video signals and digitizes them. The digitized video signals are stored in a first two-dimensional memory 7 according to a transmitting frequency index and a transmitting period index. A range compression device 8 resolves sequences of these digital video signals in a range direction by performing an inverse Fourier transformation on columns of data stored in the memory 7 which have the same transmission period. A cross-range compression device 10 resolves sequences of these digital signals in a cross-range direction by performing a Fourier transformation on rows of digital video signals which have the same range.

10 Claims, 9 Drawing Sheets

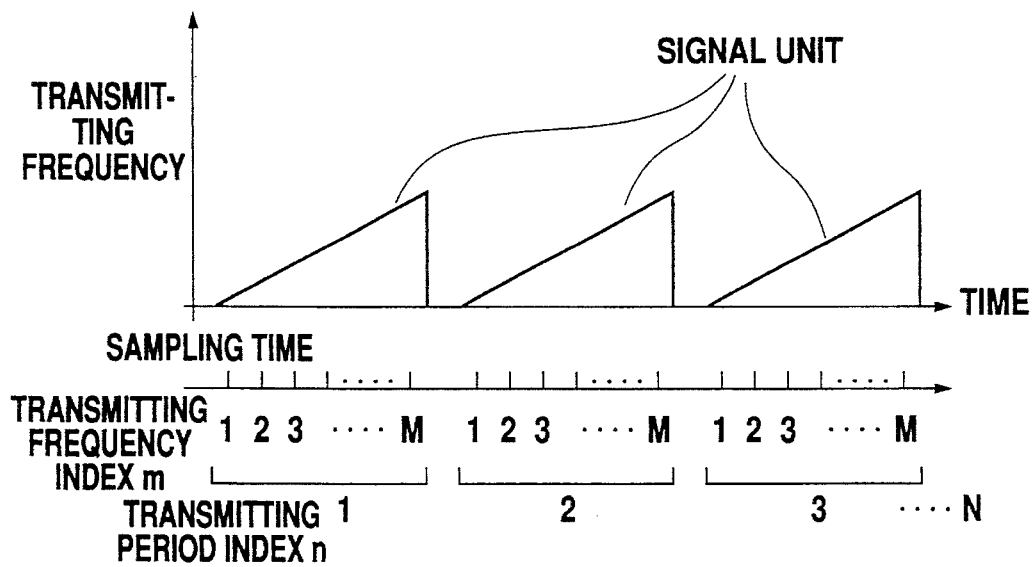
Fig. 3
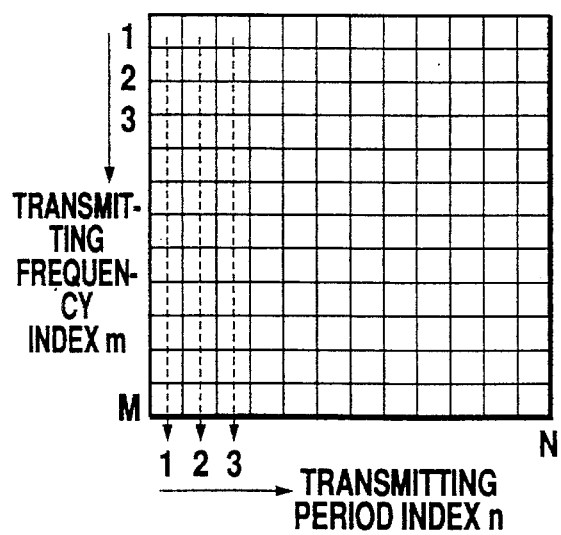 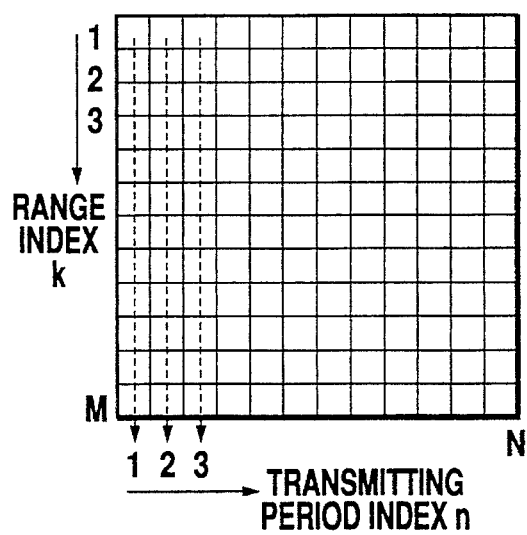
Fig. 4a  Fig. 4b 5,485,160

RADAR-TYPE OBJECT SHAPE DETECTOR

BACKGROUND OF THE INVENTION

1. Field of the Invention

This invention relates to an apparatus which detects the shape of a target carried on a conveyor.

2. Description of the Related Art

FIG. 17 is a drawing showing the construction of a conventional radar-type object shape detector.

FIG. 18 is a descriptive diagram showing the positional relation between a radar device and an object in this conventional detector. In the figures, a transmitter 25 emits a continuous waveform signal with a fixed transmitting frequency. A transmitting antenna 26 forms a narrow beam having a sufficiently high angular resolution to detect the shape of a target 11. The transmitting antenna 26 is driven by an antenna driver 29 so as to cause the beam 32 to sweep in a vertical direction at an interval equal to the beam width. Each time the target 11 moves horizontally by the same amount as the width of the beam 32 in a horizontal direction, the beam 23 is made to sweep progressively in a vertical direction. Due to this sweep of the beam, reflected signals are obtained from the whole surface of the target 11.

A receiving antenna 28 receives a reflected signal beam 33, this beam being of the same shape as the transmitting beam 32. The receiving antenna 28 is driven by the antenna driver 29 so that it sweeps across the reflected beam 33 in the same way as the transmitting beam 32 is made to sweep. The reflected signals from the target 11 which are received by the receiving antenna 28, are amplified and detected by a receiver 30. The receiver 30 outputs video signals obtained by this detection to a display 31 in synchronism with the sweep of the transmitting beam generated by the antenna driver 29.

When the display 31 receives these video signals, it also receives a location signal showing the distance the target was carried by a conveyor 27, and an antenna angle signal output by the antenna driver 29. The display 31 computes the cooridnates of the target in a horizontal direction from the location signal, and the coordinates of the target in a vertical direction from the antenna angle signal, and displays the aforementioned video signal based on these coordinates. The display 31 thereby forms an image of the target. In this way, a conventional radar-type object shape detector was able to detect and display the shape of a moving target.

Due to the aforesaid construction, this radar-type object shape detector had to form a narrow beam with a high angular resolution in order to detect the shape of the target in a desired degree of detail. However in radar devices, the radar beam width is inversely proportional to the aperture size of the antenna. Hence, in order to form a narrow beam and improve the resolution of a conventional detector, the aperture size of the transmitting and receiving antennas had to be increased, which made the apparatus too bulky. As an example, to form a beam of wavelength=3 mm and beam width=0.1°, the antenna was required to have an aperture size of approximately 2.1 m.

This invention aims to overcome the above problem. It therefore aims to provide a radar-type object shape detector which can detect the shape of a target with high resolution even using a compact antenna of small aperture size and consequently, a large beam width.

SUMMARY OF THE INVENTION

In a first aspect of the invention, there is provided an apparatus for detecting the shape of a target by means of radar, this apparatus comprising:

a transmitter which emits a continuous wave signal, this signal comprising a unit which is repeated with a fixed period, the transmitting frequency being continuously varied within a predetermined frequency bandwidth for each signal unit, a transmitting antenna which radiates this transmitting signal output by the transmitter towards the target, conveyor means which transports the target, and rotates it in the transmitting beam formed by the transmitting antenna, a receiving antenna which receives signals reflected by the target, a receiver which receives the signals output by the receiving antenna, and converts them to I/Q (In-Phase Quadrature) video signals by performing orthogonal phase detection, a signal generated by delaying the transmitting signal by the propagation time required for radio waves to travel in both directions between the rotation axis of the target and the receiving antenna being used as a reference signal when orthogonal phase detection is performed, an A/D converter which sets sampling times according to transmission frequencies which divide the frequency bandwidths in the aforesaid signal units into a predetermined number of equal parts, and samples and digitizes the aforesaid I/Q video signals at each of these sampling times, a first two-dimensional memory which stores the digitized I/Q video signals output by the A/D converter in a sequence determined by a transmission frequency index m assigned according to the sampling times in each signal unit, and by a transmission period index n assigned to each signal unit, a range compression device which collects reflected signal components from various ranges present in the digitized I/Q video signals into groups of components having the same range, by performing an inverse Fourier transformation on the digitized I/Q video signals stored in the first two-dimensional memory in the direction of the transmission frequency index for each column having the same transmission period index, and thereby generates video signal data which is resolved in the range direction, a second two-dimensional memory which stores video signal data resolved in the range direction, in the form of a two-dimensional matrix according to a range index k assigned to the data according to range, and to the transmission period index n, and a cross-range compression device which collects reflected signal components from various directions present in the video signals resolved according to range, into groups of components having the same Doppler frequency, by performing a Fourier transformation on the video signals stored in the second two-dimensional memory in the direction of the transmission frequency index for each row having the same range index, thereby generating video signal data which is resolved in the cross-range direction corresponding to the Doppler frequency, and performs amplitude detection on the video signals so resolved in the cross-range direction so as to generate image data.

According to this construction, reflected signal components from various ranges which are present in the I/Q video signals are collected into groups of components having the same range by performing an inverse Fourier transformation on the I/Q video signals using the range compression device, and as a result, the signals from the target are resolved in the range direction.

Then, reflected signal components from various directions which are present in the video signal data are collected into groups of components having the same Doppler frequency by performing a Fourier transformation on the video signals which have been resolved in the range direction by the range compression device, using the cross-range compression device. As the Doppler frequency of a reflected signal from the rotating target is directly proportional to the distance from the rotation axis in the cross-range direction, data which is arranged in order of Doppler frequency will be arranged in order of distance in the cross-range direction. The reflected signal from the target is therefore resolved in the range direction and cross-range direction by the range compression device and the cross-range device. According to this procedure, the resolving power in the range direction and cross-direction is not directly proportional to the size aperture of the antenna. Hence, even if an antenna of small size aperture is used, the shape of the target can be detected with high resolving power.

In a second aspect of the invention, there is provided an apparatus for detecting the shape of a target by means of radar, this apparatus comprising:

a transmitter which emits a continuous wave signal, said signal comprising a unit which is repeated with a fixed period, the transmitting frequency being varied in a stepwise manner within a predetermined frequency bandwidth for each signal unit, a transmitting antenna which radiates said transmitting signal output by the transmitter towards the target, conveyor means which transports said target, and rotates it in the transmitting beam formed by said transmitting antenna a receiving antenna which receives signals reflected by said target, a receiver which receives the signals output by said receiving antenna, and converts them to I/Q (In-Phase Quadrature) video signals by performing orthogonal phase detection, a signal generated by delaying the transmitting signal by the propagation time required for radio waves to travel in both directions between the rotation axis of the target and the receiving antenna being used as a reference signal when orthogonal phase detection is performed, a timing generator which outputs timing signals that vary the transmitting frequency of said transmitting signal to said transmitter, and generates sampling time signals which are delay synchronized with said timing signals, an A/D converter which samples and digitizes said I/Q video signals according to said sampling time signals generated by said timing generator, a first two-dimensional memory which stores said digitized I/Q video signals output by said A/D converter in a sequence determined by a transmission frequency index m assigned according to the sampling times in each signal unit, and a transmission period index n assigned to each signal unit, a range compression device which collects reflected signal components from various ranges present in said digitized I/Q video signals into groups of components having the same range, by performing an inverse Fourier transformation on said digitized I/Q video signals stored in said first two-dimensional memory in the direction of the transmission frequency index for each column having the same transmission period index, and thereby generates video signal data which is resolved in the range direction, a second two-dimensional memory which stores said video signal data resolved in the range direction, in the form of a two-dimensional matrix according to a range index k assigned to the data according to range, and to the transmission period index n, and a cross-range compression device which collects reflected signal components from various directions present in said video signals resolved according to range, into groups of components having the same Doppler frequency, by performing a Fourier transformation on said video signals stored in said second two-dimensional memory in the direction of the transmission frequency index for each row having the same range index, thereby generating video signal data which is resolved in the cross-range direction corresponding to the Doppler frequency, and performs amplitude detection on said video signals so resolved in the cross-range direction so as to generate image data.

According to this construction, the same effect is obtained as in the case of the first embodiment. In addition, due to the fact that the transmitting frequency is varied in a stepwise fashion, a more precise chirp signal is obtained than in the case when the transmitting signal is varied continuously, and the range resolving power is thereby improved.

In another aspect of the invention, an image wherein the scales in the range direction and cross-direction are the same, is obtained by displaying the image data on the display after converting interval units between picture elements in the cross-range direction of the image data output by the cross-range compression device, into units equivalent to interval units between picture elements in the range direction by using the angular velocity signal.

In another aspect of the invention, it is recognized, by matching image data obtained by the cross-range compression device with reference data previously stored in a data base, whether or not a target whereof the shape has been detected is an object represented by the reference data.

In yet another aspect of the invention, reflected signals from sources other than the target are diminished by using a suspension transport device or a rotating device with a lift.

BRIEF DESCRIPTION OF THE DRAWINGS

FIG. 3 is a diagram showing the variation of transmitting frequency of a transmitter according to the first embodiment.

FIG. 4a is a diagram describing the procedure whereby data is stored in a first two-dimensional memory.

FIG. 4b is a diagram describing the procedure whereby data is stored in a second two-dimensional memory.

DETAILED DESCRIPTION OF THE PREFERRED EMBODIMENTS

Embodiment 1

Figure 1:
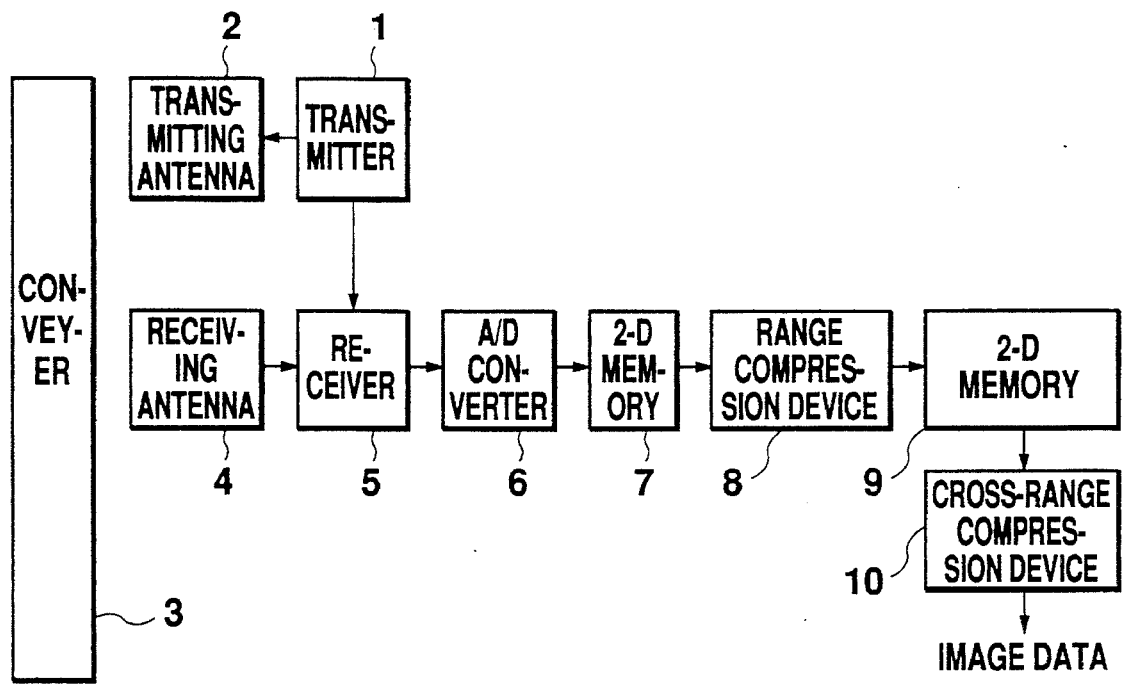
FIG. 1 is a block diagram of a first embodiment of an object shape detector according to this invention.

FIG. 1 is a diagram showing the construction of a first embodiment of the object shape detector according to this invention.

In the figure, a transmitter 1 continuously and linearly varies a transmitting frequency within a predetermined frequency bandwidth to form a signal unit. This signal unit is repeated with a fixed period so as to generate a transmitting signal with a continuous waveform, as shown in FIG. 3. The transmitter 1 repeats this signal unit N times during the time required to detect the shape of the object.

According to the detector of this embodiment, the signals reflected by the object, as will be described in detail hereinafter, are sampled and digitized. The sampling time interval and rate are set to be the same for all signal units. Let the sampling number in one signal unit be M, indices being assigned in order to sampling operations from 1 to M in each signal unit. The transmitting frequency has the same value for the sampling operation corresponding to the same index in each signal unit. The index m (m=1, 2, ... M) assigned to the sampling operation may then be considered to represent the order of transmitting frequencies, and the index m will therefore be referred to as the transmitting frequency index.

The transmitting signal $X_{s(m)}$ generated by the transmitter 1 may be represented by the following equation.

$$X_{s(m)} = A \, exp(j\omega_m t + \phi_0) \tag{1}$$

where $X_{s(m)}$=transmitting signal m=transmitting frequency index (m=1,2, ... , M)

A=amplitude $\omega_m$=transmitting frequency×2π

$\phi_0$=initial phase j=imaginary unit

Figure 2:
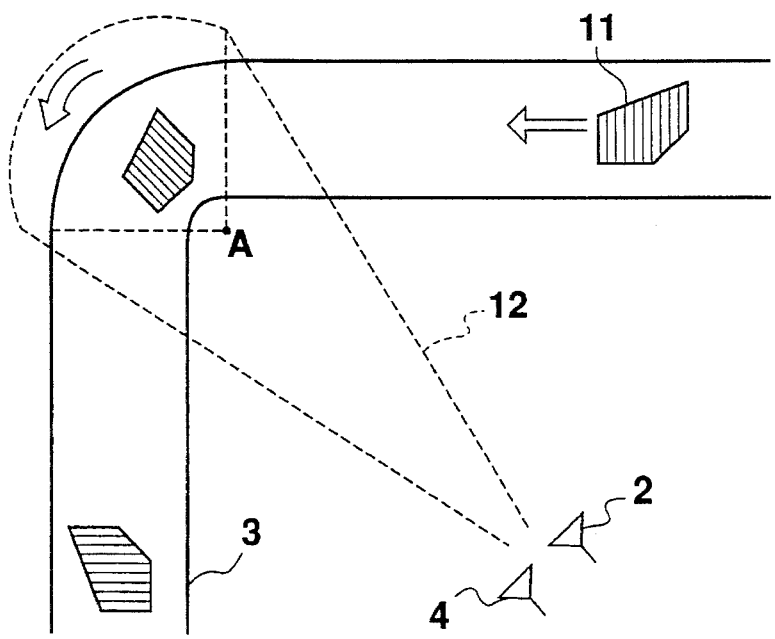
FIG. 2 is a drawing showing the positional relation between radar antenna and a target according to the first embodiment.

This transmitting signal is radiated from a transmitting antenna 2 towards a target which is moving on a conveyor 3. FIG. 2 is a plan view of how the radar beam is transmitted to and received from a target 11 transported by the conveyor. The conveyor 3 may for example be a belt conveyor, a bend being provided in the moving path of objects which are transported by it. At the bend, the target 11 is rotated around a point A in the figure as rotation axis. The transmitting antenna 2 emits a transmitting beam 12 toward the bend in the conveyor.

Next, a receiving antenna 4 receives signals reflected from the target 11 which constitute a beam of the same form as that of the transmitting beam 12. The received signals output by the receiving antenna 4 are input to a receiver 5. The receiver 5 performs orthogonal phase detection on the signals output by the receiving antenna 4, using a signal generated by delaying the transmitting signal by the time required for radio waves to be propagated to travel in both directions between the rotation axis A of the target and the receiving antenna 4 as a reference signal, and these output signals are converted to I/Q (In-Phase/Quadrature) video signals of the kind given by the following equation (2).

$$X_{r(m,t)} = A \, exp(j\, \phi_{r(m,t)}), \; \phi_{r(m,t)} = 2\omega_m(r_{(t)} - r_A)/c \tag{2}$$

where $X_{r(m,t)}$=signal received from point r $\phi_{r(m,t)}$=phase of signal received from point r $r_{(t)}$=distance between point r and transmitting radar at time t $r_A$=distance between rotation axis A of target and receiving radar c=propagation speed of radio waves The I/Q video signals given by the above Equation (2) are detected by separating them into an In-Phase component and a Quadrature component.

Next, an A/D converter 6 samples the I/Q video signals output by the receiver 5 at sampling times set with reference to the aforesaid transmitting signal, and digitizes them.

The digitized I/Q video signals are successively input to a first two-dimensional memory 7. The cells of the memory 7 respectively store digitized video signal data sampled at each sampling time. The digitized video signals are stored in the cells of the memory 7 in, for example, the form I+jQ, where I is the In-Phase component and Q is the Quadrature component.

The digitized video signals successively output by the A/D converter 6 are progressively stored in the memory 7 as shown in FIG. 4a. In each transmission period, the digitized video signals are stored in one column in the order of the transmitting frequency index m (m=1, 2, ... , M). First, digitized video signals in the first transmission period, i.e. signals corresponding to the transmission period index 1, are stored in the first column of the memory 7 in a sequence from 1 to M according to the transmission frequency index. Next, data with the transmission period index 2 are stored in the second column of the memory 7 in the same order. This procedure is repeated in the order of the transmission period index n until the last column corresponding to the transmission period index N. As a result, the cells of each horizontal row in the first memory 7 contain digitized video signal data corresponding to the same transmission frequency.

The digitized video signals stored in the cells of the first memory 7 in the manner hereintofore described, consist of a mixture of signals reflected from various positions (distances and orientations) on the target. According to this embodiment, the data in the cells is resolved according to range and direction as hereinafter described.

First, by means of a range compression device 8, an inverse Fourier transformation is performed according to Equation (3) on each column, having a different transmission period index, of the digitized video signals stored in the first memory 7.

$$\int_{-\frac{\Delta\omega}{2}}^{\frac{\Delta\omega}{2}} A\exp\left\{j\frac{2\omega_m}{c}(r_{(t)}-r_A)\right\} \exp(j\omega t)\, d\omega \quad (3)$$

where $\Delta\omega$=transmission frequency bandwidth

Digitized video signals corresponding to different transmission frequencies in the same transmission period are stored in sequence in the vertical columns of the memory 7, and this data can be regarded as a function of the transmission frequency. Hence, if an inverse Fourier transformation is applied to this function using Equation (3), the I/Q video signals can be expressed as a function of the time t. In this context, the time t represents the propagation time required for radio waves emitted by the transmitting antenna to travel to the receiving antenna. By applying this inverse Fourier transformation, reflected signal components in the data in each cell are arranged according to their propagation time, and reflected signal components having the same propagation time are grouped together. As a result data sequences, wherein reflected signal components having the same propagation time are superposed, are obtained with respect to the propagation time t.

Further, the propagation time t of the radio waves is directly proportional to the distance from the antenna to the reflecting point on the target, i.e. to the range. The data sequences obtained by the inverse Fourier transformation can therefore be regarded as signals reflected from the target which have been arranged in range order.

The video signals thereby arranged (i.e. resolved) in range order by the aforementioned inverse Fourier transformation are stored in a second two-dimensional memory 9 according to a range index k (i.e. in order of increasing range) as shown in FIG. 4b. Hence, the cells of this second two-dimensional memory 9 contain superposed values of reflected signal components having corresponding ranges.

When the above procedure is complete for all transmission period index columns, the second two-dimensional memory will have been structured according to range, and will contain I/Q video signal data sequences arranged in order of the range index k. By means of this procedure, therefore, the two-dimensional data sequences containing a mixture of reflected signals having different range and direction (in the first memory 7), are converted into two-dimensional data sequences arranged in range order (in the second memory 9), and the target is resolved in the range direction. In this process, the resolving power in the range direction, as is well-known from pulse compression radar technology, is determined by the frequency bandwidth of each signal unit, and it increases as the bandwidth becomes wider.

The digitized I/Q video signals stored in the second two-dimensional memory 9 in this way contain reflected signal components from various directions which have the same range (distance from the antenna). A cross-range compression device 10 is now used to separate and arrange these signal components in different directions, as hereinafter described.

First, the data stored in the second two-dimensional memory 9 is input to the cross-range compression device 10 in rows having the same range index. The cross-range compression device 10 then performs a Fourier transformation on the data on these rows of data having the same range index.

Each row of the second two-dimensional memory 9 contains digitized I/Q video signal data having different transmission periods and the same range arranged in order of the transmission period index. This data is a function of the transmission period index, and it can be regarded as a function of time. Therefore, by applying a Fourier transformation to this time function, the data can be obtained as a function of frequency. Reflected signal components contained in the digitized I/Q video signal data in each cell corresponding to each range (row), are arranged according to frequency, and reflected signal components having the same frequency are grouped together. As a result, the digitized I/Q video signal data is arranged in frequency order for each range.

Each cell in the rows of data having the same range contains reflected signal components having the same range, and it may be considered that frequency differences between these components are due to the Doppler effect. The I/Q video signal data obtained by Fourier transformation are therefore arranged in a horizontal direction in the order of their Doppler frequency for each range.

Figure 5:
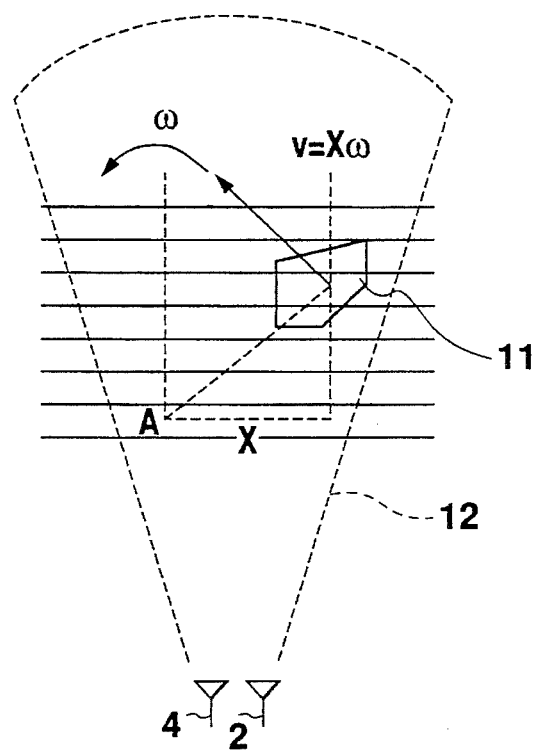
FIG. 5 is a diagram describing the relation between the rotation of the target and its Doppler frequency.

FIG. 5 shows the rotation of the target and the Doppler frequency generated by this rotation. In the following description, the term range direction shall be understood to mean the radiating direction of the radar beam, and the term cross-range direction to mean the direction perpendicular to the range direction in a plane containing the path of motion of the target. In FIG. 5, the point A is the rotation axis of the target 11. If the target 11 rotates at an angular velocity $\alpha$, the Doppler frequency $f_d$ at a point distant by x in the cross-range direction from the point A is given by $$f_d = \frac{2 \times \alpha}{\lambda} \quad (4)$$

where $\lambda$=transmitting wavelength The Doppler frequency resolving power $\Delta f_d$ is given by $$\Delta f_d = \frac{2\Delta \times \alpha}{\lambda} \quad (5)$$

where $\Delta x$=resolving power in cross-range direction

From this equation, it is seen that the Doppler frequency $f_d$ is directly proportional to the distance in the cross-range direction. Data sequences arranged in order of their Doppler frequencies obtained by the cross-range compression device 10 may therefore be considered as being arranged in order of distance in the cross-range direction, and the target is thereby resolved in the cross-range direction. The resolving power in the cross-range direction is the difference in Doppler frequencies between adjacent data in the same range obtained by the Fourier transformation, and this is the Doppler frequency resolving power $\Delta f_d$. $\Delta f_d$ is the reciprocal of the time T for which the target is inside the radiating region of the radar beam. It therefore follows that the resolving power in the cross-range direction can be increased by decreasing the speed of motion of the target.

The data obtained by the Fourier transformation in the cross-range compression device 10 therefore consists of I/Q video signals resolved in the range direction and the cross-range direction. This data represents digitized I/Q video signals for positions indicated by specific range direction coordinates and cross-range direction coordinates.

The cross-range compression device 10 then generates video data by amplitude detection of the digitized I/Q video signals obtained as hereintofore described. This amplitude detection is performed by calculating the signal amplitude, for example using $(I^2+Q^2)^{1/2}$, from the I and Q components of the digitized I/Q video signals. Alternatively, the video signal power may be found from the I and Q components.

As hereinabove described, therefore, according to this embodiment, high resolution video data can be obtained by adjusting the frequency bandwidth of signal units and performing the above signal processing even when an antenna of small aperture size is used.

Embodiment 2

Figure 6:
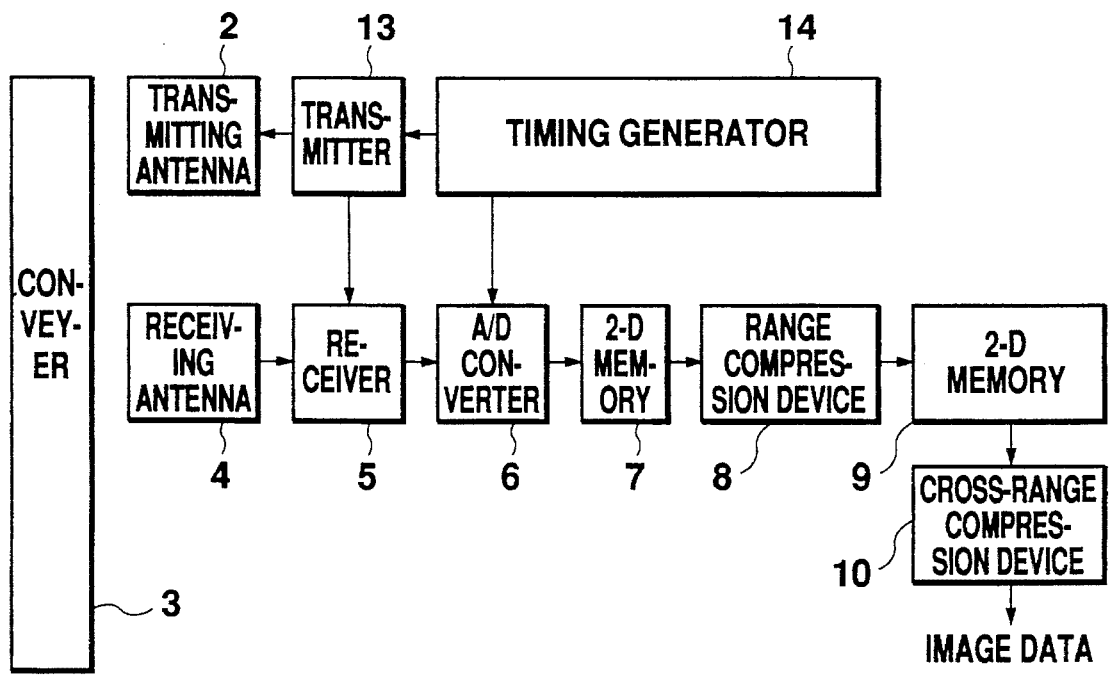
FIG. 6 is a block diagram showing the construction of a second embodiment of the object shape detector according to this invention.

FIG. 6 is a block diagram of the construction of a second embodiment of the invention. In the figure, parts which are identical or correspond to parts of the apparatus of the first embodiment are given the same reference numerals, and their description will be omitted here.

Figure 7:
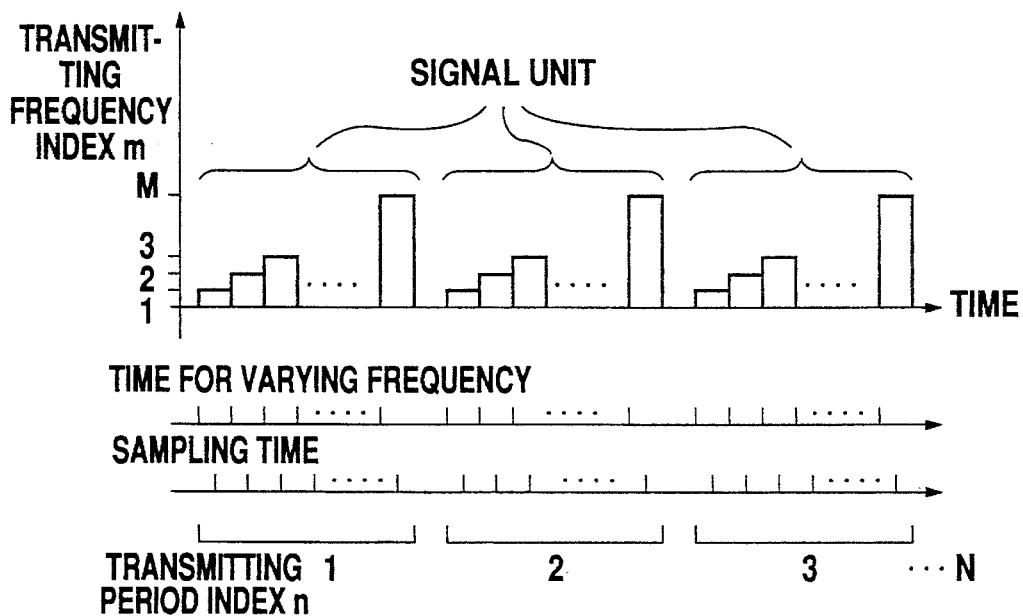
FIG. 7 is a diagram showing the variation of transmitting frequency of a transmitter according to the second embodiment.

In the figure, a transmitter 13 generates a signal unit by progressively varying the transmitting frequency in a stepwise manner in the same time interval within a predetermined frequency bandwidth as is shown in FIG. 7. This signal unit is repeated with a fixed transmitting period so as to generate a transmitting signal having a continuous waveform. The times at which the transmitting frequency is varied in steps are generated by a timing generator 14.

If numbers from 1 to M are assigned to the transmitting frequency which is varied in a stepwise manner in each signal unit, this transmitting signal may be represented by the aforesaid Equation (11). The transmitting signal is then radiated from the transmitting antenna 2 and the signals reflected by the target are received by the receiving antenna 4, the operations which occur until the receiver 5 performs orthogonal phase detection on the reflected signals being the same as those in the apparatus of the first embodiment hereinabove described.

Next, the A/D converter 6 samples and digitizes the I/Q video signals output by the receiver 5 according to timing signals supplied by the timing generator 14, and successively outputs these digitized I/Q video signals to the first two-dimensional memory 7. The timing signals supplied by the timing generator 14 are delayed by a predetermined time with respect to the timing with which the transmitting frequency is varied in stepwise manner, as shown in FIG. 7. This delay time is effectively equal to the sum of the time required for the frequency to stabilize when the transmitting frequency is varied in steps by the transmitter 13, and the propagation time required for radio waves to travel in both directions between the rotation axis A of the target (see FIG. 2) and the antenna.

The operations performed by parts of the apparatus after the first two-dimensional memory 7 are the same as those performed by the apparatus of the first embodiment. Therefore, according to this embodiment as in the case of the first embodiment, image data is obtained with a high resolving power even if an antenna of small aperture size is used.

Embodiment 3

Figure 8:
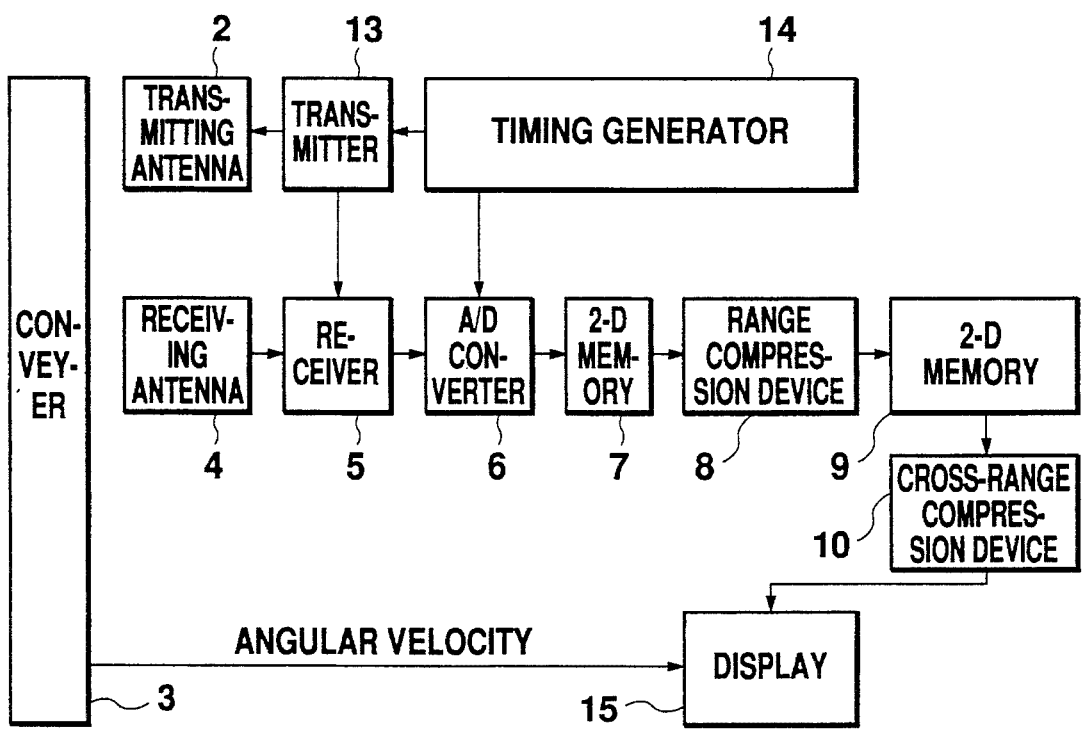
FIG. 8 is a block diagram showing the construction of a third embodiment of the object shape detector according to this invention.

FIG. 8 is a block diagram showing the construction of a third embodiment of the object shape detector according to this invention. This embodiment is an improved version of the second embodiment. In the figure, parts which are identical or correspond to parts of the apparatus of the second embodiment are given the same reference numerals, and their description will be omitted here.

The apparatus of this embodiment generates image data in exactly the same way as the apparatus of the second embodiment. A characteristic of the apparatus of this embodiment is the way in which the image data so generated is displayed.

In the data sequences output by the cross-range compression device 10, the intervals between picture elements in the range direction are in units of m (meter:length), but the intervals between picture elements in the cross-range direction are in units of Hz (frequency). If the image data is displayed in this form, the scales in the range direction and cross-range direction will be different and the image will be distorted. According to this embodiment, therefore, the display 15 converts the scale of the image data in the cross-range direction from Hz (frequency) units to m (length) units based on the following equation (6).

$$\Delta x = \frac{\lambda \Delta f_d}{2\alpha} \quad (6)$$

The above equation is derived from the aforesaid Equation (5).

$\Delta f_d$ in Equation (6) is the difference of Doppler frequencies between picture elements in the cross-range direction, as hereintofore described, and is determined when the Fourier transformation is performed by the cross-range compression device 10. The angular speed a of the target is obtained from the conveyor 3.

According to this embodiment, therefore, an image having the same scale in the range direction and cross-range direction is obtained.

Embodiment 4

Figure 9:
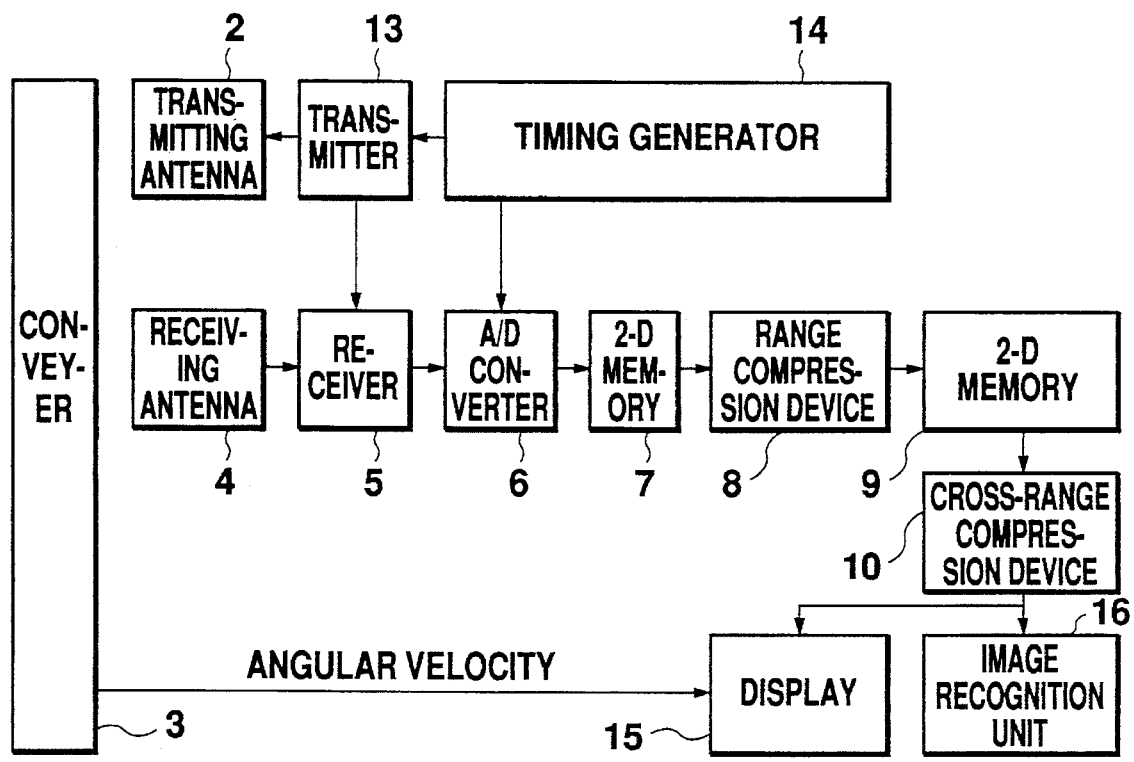
FIG. 9 is a block diagram showing the construction of a fourth embodiment of the object shape detector according to this invention.
Figure 10:
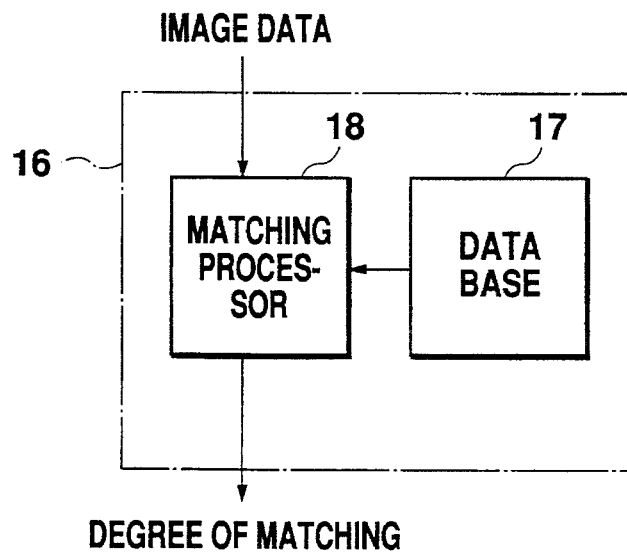
FIG. 10 is a block diagram showing the construction of an image recognition device according to the fourth embodiment.

FIG. 9 is a block diagram showing the construction of a fourth embodiment of this invention. The object shape detector comprises an image recognition unit 16 in addition to the apparatus of the aforesaid Embodiment 3. FIG. 10 is a block diagram showing the internal construction of the image recognition unit 16.

In FIG. 9, the operation of component parts other than the image recognition unit 16 is the same as in the third embodiment. Hereinafter, the operation of the image recognition unit 16 will be described.

First, the shape of a predetermined object is detected by the object shape detector of this embodiment. The image data thereby generated is stored as reference data in a data base 17 of the image recognition unit 16. When the image of a target transported by the conveyor 3 is to be recognized, image data corresponding to the target generated by the cross-range compression device 10 is input to an image matching processor 18 of the image recognition unit 16, and correlations are made between this image data and the reference data stored in the data base 17.

Figure 11:
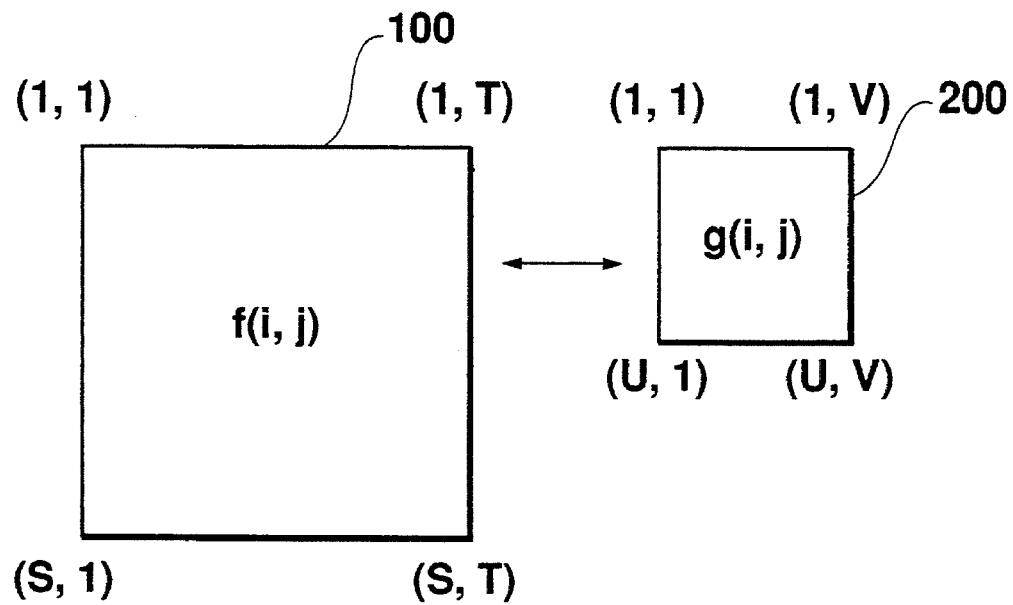
FIG. 11 is a diagram for the purpose of describing image data and reference data according to the fourth embodiment.

The operation of the image matching processor 18 will now be described with reference to FIG. 11 and FIG. 12. In FIG. 11, data 100 represents image data generated by the cross-range compression device 10, and data 200 represents reference data stored in the data base 17. Data values for each of the picture elements in the image data 100 and reference data 200 are expressed by the following equations.

| Image data | $f(i, j)$ | $(1 \leq i \leq S, 1 \leq j \leq T)$ |
| Reference data | $g(i, j)$ | $(1 \leq i \leq U, 1 \leq j \leq V)$ |

The image matching processor 18 correlates the image data 100 and the reference data 200. The correlation procedure is described in FIG. 12.

Figure 12:
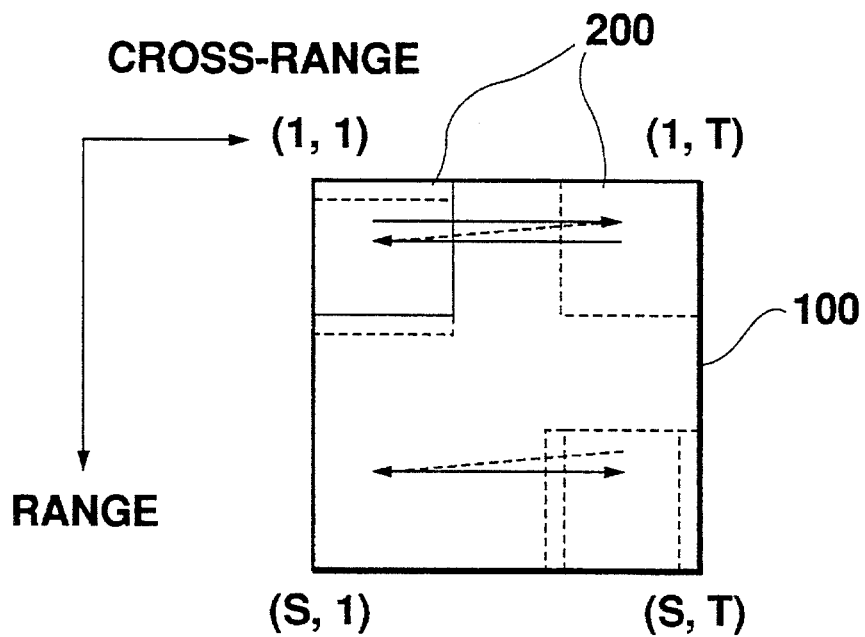
FIG. 12 is a diagram for the purpose of describing the action of an image matching processor according to the fourth embodiment.

Using the reference data 200 as a template, the image data 100 is scanned by sliding one picture element at a time from upper left to lower right of the data as shown in FIG. 12. A degree of matching $R_{(m,n)}$ is then calculated by the following Equation (7) for each picture element scanned.

$$R_{(m,n)} = \frac{\sum\sum_{(i,j) \in D} f(i,j) \cdot g(i-s, j-t)}{\left\{ \sum\sum_{(i,j) \in D} f^2(i,j) \right\}^{1/2} \left\{ \sum\sum_{(s,t) \in D} g^2(i-s, j-t) \right\}^{1/2}} \quad (7)$$

where $D=\{(i, j) | 1 \leq i-s \leq U, 1 \leq j-t \leq V\}$

When the image data $f(i,j)$ exactly coincides with the reference data $g(i-s, j-t)$, the degree of matching=1. The higher the degree of matching (the closer it is to 1), the more closely the image data resembles the reference data. Therefore, by examining the magnitude of the degree of matching, it is possible to determine whether or not a detected target is a known object, and the target can therefore be identified.

The image recognition unit 16 of this embodiment can also be applied to the apparatus of the first or second embodiments.

Embodiment 5

Next, a fifth embodiment of the invention will be described. In particular, a preferred embodiment of the construction of the conveyor will be given.

Figure 13:
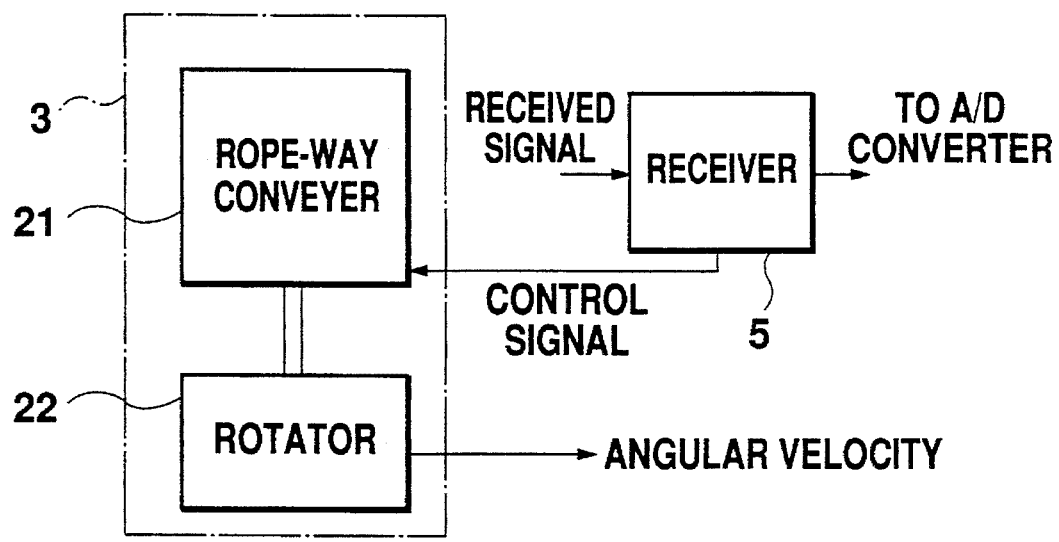
FIG. 13 is a block diagram showing the essential construction of a fifth embodiment of the object shape detector according to this invention.
Figure 14:
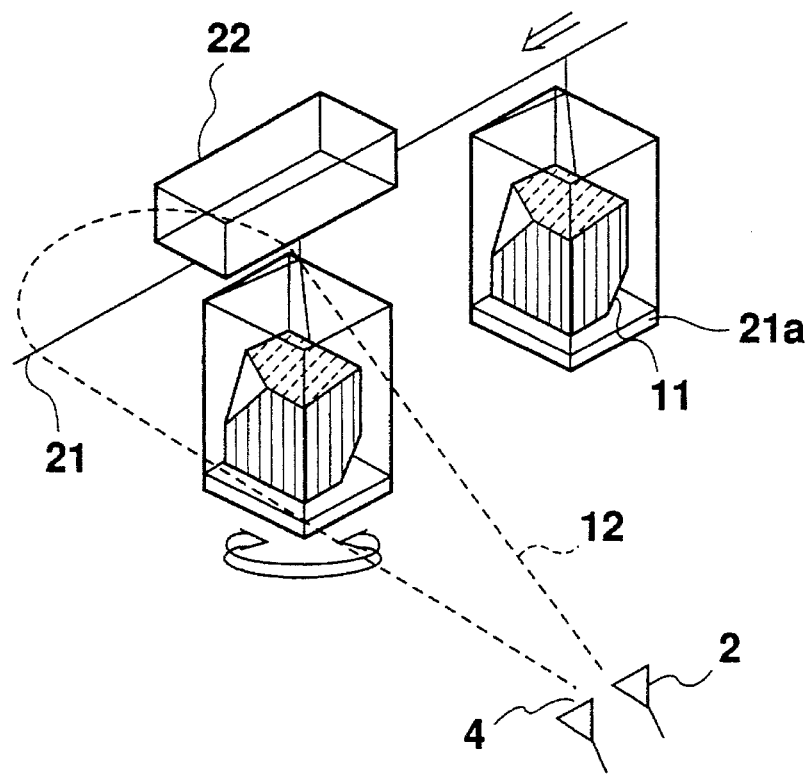
FIG. 14 is a view in perspective for the purpose of describing the action of the fifth embodiment.

FIG. 13 is a block diagram of the construction of the conveyor. FIG. 14 is a view in perspective showing the manner in which the conveyor 3 operates.

According to this embodiment, a suspension ropeway conveyor 21 is used to reduce signals reflected from the conveyor 3. The target 11 is mounted on a transport platform 21a, and is moved along a line while suspended from the ropeway conveyor 21. A rotator 22 is connected to the ropeway conveyor 21. The transmitting beam 12 output by the transmitting antenna 2 is radiated directly beneath the rotator 22. When the target 11 comes within the radar beam, the receiver 5 detects that the target is present, and the receiver 5 then outputs a control signal to the ropeway conveyor 21 to stop the linear motion of the target 11. After the ropeway conveyor 21 has stopped the target 11 in accordance with this control signal, the rotator 22 is operated so as to rotate the target 11. The signal reflected by the target 11, which is now rotating, is received by the receiving antenna 4. The same signal processing is then performed as in the case of the aforesaid Embodiments 1–4 so as to detect the shape of the target 11.

According to this embodiment, due to the use of the suspension ropeway conveyor 21, reflected signals other than those from the target 11 are decreased, and the shape of the target 11 can therefore be detected more precisely.

Embodiment 6

A sixth embodiment of this invention will now be described. As in the case of the fifth embodiment, this embodiment relates to the construction of the conveyor.

Figure 15:
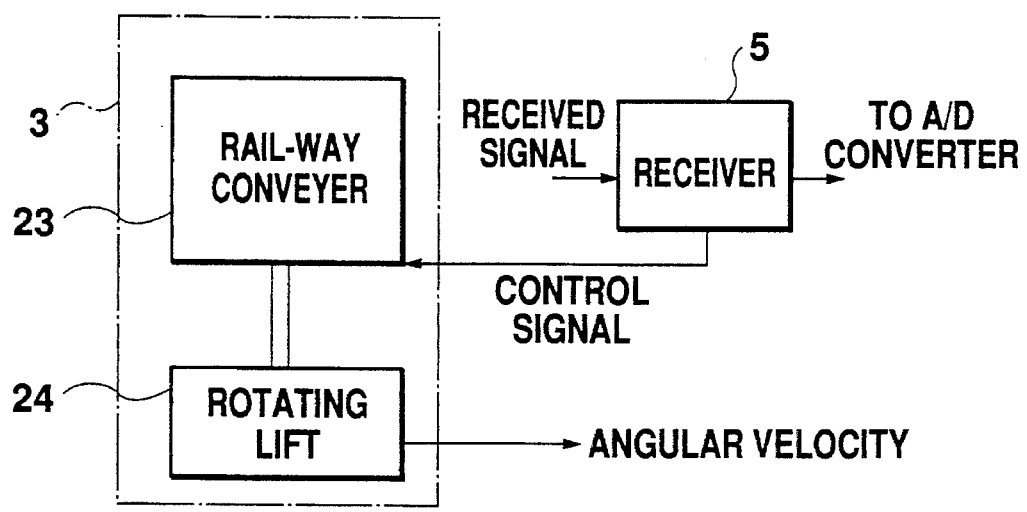
FIG. 15 is a block diagram showing the essential construction of a sixth embodiment of the object shape detector according to this invention.
Figure 16A:
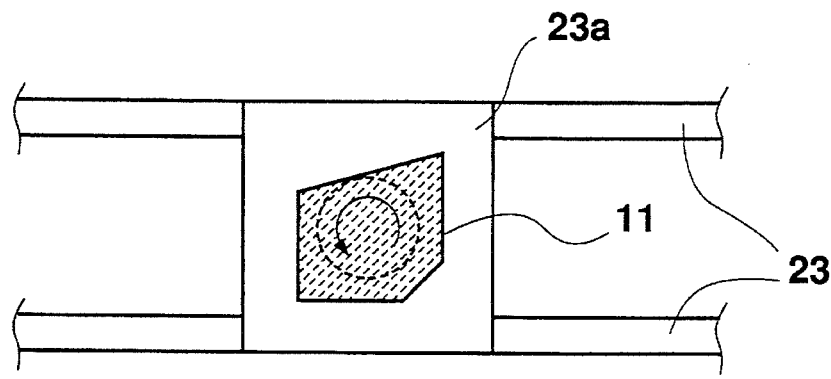
FIG. 16a is plan view for the purpose of describing the operaion of the sixth embodiment.
Figure 16B:
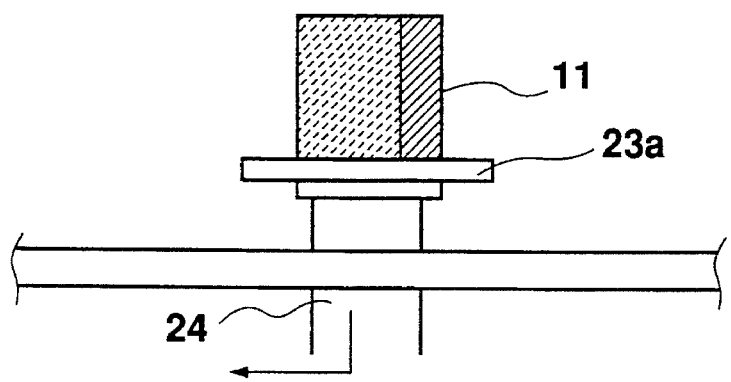
FIG. 16b is side view for the purpose of describing the operaion of the sixth embodiment.
Figure 17:
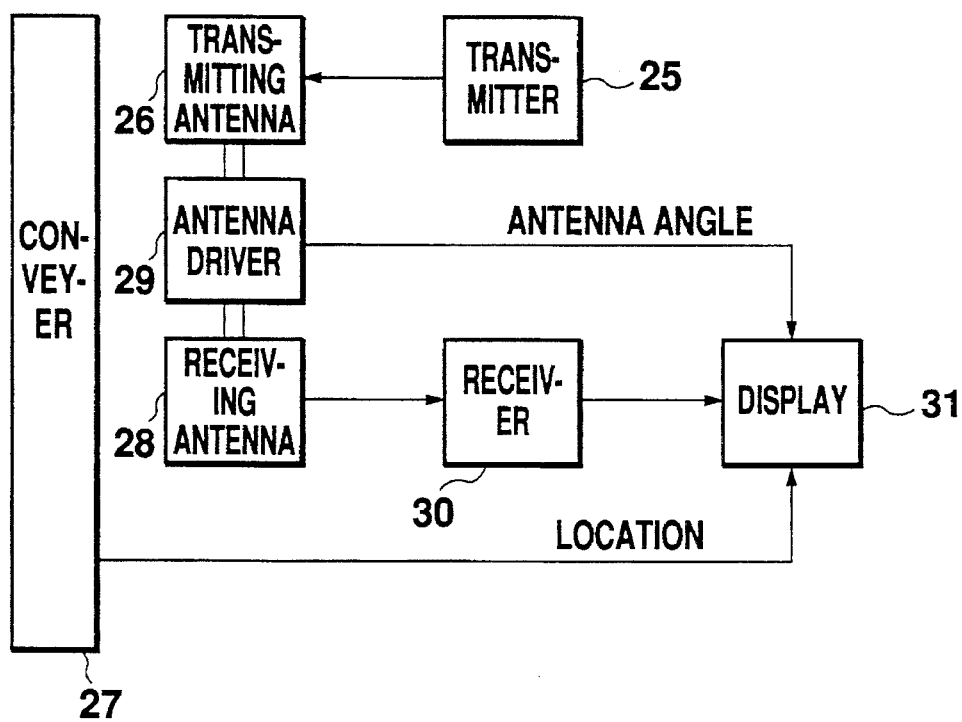
FIG. 17 is a block diagram showing the construction of a conventional radar-type object shape detector.
Figure 18:
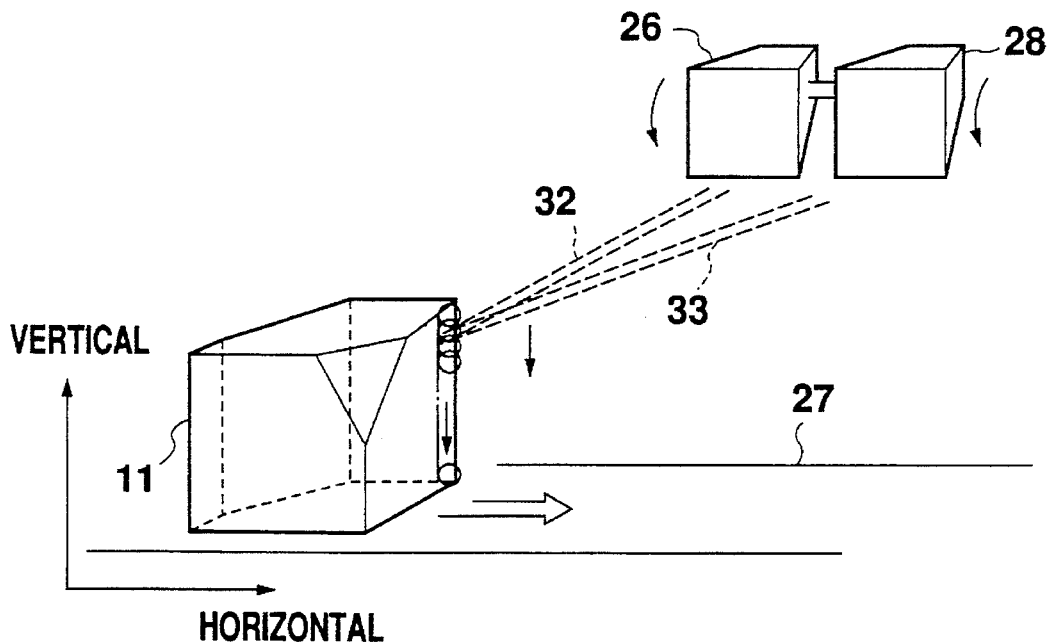
FIG. 18 is a view in perspective showing the action of a conventional radar-type object shape detector.

FIG. 15 is a block diagram showing the construction of the conveyor 3 in this embodiment. FIG. 16a and FIG. 16b are respectively plan and side views for the purpose of describing the operation of the conveyor 3.

According to this embodiment, the target 11 is lifted off the conveyor line by a lift in order to reduce reflected signals from the conveyor 3, and radar detection is performed with the target 11 in this state. The target 11 is mounted on a platform 23a, and is moved above the conveyor line on a railway-type conveyor 23. The transmitting beam is radiated directly above a rotating lift 24. When the target 11 reaches the radar beam, the receiver 5 detects the target 11, and the receiver 5 then outputs a control signal to the railway-type conveyor 23 to stop the linear motion of the target 11. After the railway-type conveyor 23 has stopped the target 11 in accordance with this control signal, the target 11 is lifted above the conveyor line and rotated by the rotating lift 24. The signal reflected by the target 11, which is now rotating, is received by the receiving antenna 4. The same signal processing is then performed as in the case of the aforesaid Embodiments 1–4 so as to detect the shape of the target 11.

According to this embodiment, due to the use of the rotating lift 24, reflected signals other than those from the target 11 are decreased, and the shape of the target 11 can therefore be detected more precisely.

What is claimed is:

1. An apparatus for detecting the shape of a target by means of radar, said apparatus comprising:

a transmitter which emits a continuous wave signal, said signal comprising a unit which is repeated with a fixed period, the transmitting frequency being continuously varied within a predetermined frequency bandwidth for each signal unit, a transmitting antenna which radiates said transmitting signal output by the transmitter towards said target, conveyor means which transports said target, and rotates it in the transmitting beam formed by the transmitting antenna, a receiving antenna which receives signals reflected by said target, a receiver which receives the signals output by said receiving antenna, and converts them to I/Q (In-Phase Quadrature) video signals by performing orthogonal phase detection, a signal generated by delaying the transmitting signal by the propagation time required for radio waves to travel in both directions between the rotation axis of the target and the receiving antenna being used as a reference signal when orthogonal phase detection is performed, an A/D converter which sets sampling times according to transmission frequencies which divide the frequency bandwidths in the aforesaid signal units into a predetermined number of equal parts, and samples and digitizes the aforesaid I/Q video signals at each of these sampling times, a first two-dimensional memory which stores said digitized I/Q video signals output by said A/D converter in a sequence determined by a transmission frequency index m assigned according to the sampling times in each signal unit, and by a transmission period index n assigned to each signal unit, a range compression device which collects reflected signal components from various ranges present in said digitized I/Q video signals into groups of components having the same range, by performing an inverse Fourier transformation on said digitized I/Q video signals stored in said first two-dimensional memory in the direction of the transmission frequency index for each column having the same transmission period index, and thereby generates video signal data which is resolved in the range direction, a second two-dimensional memory which stores video signal data resolved in the range direction, in the form of a two-dimensional matrix according to a range index k assigned to the data according to range, and to the transmission period index n, and a cross-range compression device which collects reflected signal components from various directions present in the video signals resolved according to range, into groups of components having the same Doppler frequency, by performing a Fourier transformation on said video signals stored in said second two-dimensional memory in the direction of the transmission frequency index for each row having the same range index, thereby generating video signal data which is resolved in the cross-range direction corresponding to the Doppler frequency, and performs amplitude detection on the video signals so resolved in the cross-range direction so as to generate image data.

2. An apparatus for detecting the shape of a target by means of radar as described in claim 1, wherein said conveyor outputs an angular velocity signal representing the rotation angular velocity of said target, and said apparatus comprises a display which displays an image of said target after converting interval units between picture elements in the cross-range direction of the image data output by said cross-range compression device, into units equivalent to interval units between picture elements in the range direction by using said angular velocity signal.

3. An apparatus for detecting the shape of an object as defined in claim 1, wherein said apparatus further comprises identifying means for identifying a desired target from among various targets successively transported by said conveyor means, said identifying means comprising:

a data base for storing image data for said desired target as reference data, and a matching processor for calculating a degree of matching between image data for a target transported by said conveyor means and said reference data stored in said data base, and identifying said target transported by said conveyor according to this degree of matching.

4. An apparatus for detecting the shape of an object as defined in claim I wherein said conveyor means comprises:

a suspension type conveyor for suspending and transporting said target, a rotating device for rotating said target, and a control unit for commanding said suspension type conveyor to stop moving and commanding said rotating device to start rotating when said target has reached a transmitting beam formed by said transmitting antenna.

5. An apparatus for detecting the shape of an object as defined in claim 1, wherein said conveyor means comprises:

a railway conveyor for transporting said target mounted on a transport platform, a rotating lift which lifts said target mounted on said transport platform, and rotates said target, a control unit for commanding said railway conveyor to stop moving and commanding said rotating lift to start lifting and rotating said target when said target has reached a transmitting beam formed by said transmitting antenna.

6. An apparatus for detecting the shape of a target by means of radar, said apparatus comprising:

a transmitter which emits a continuous wave signal, said signal comprising a unit which is repeated with a fixed period, the transmitting frequency being varied in a stepwise manner within a predetermined frequency bandwidth for each signal unit, a transmitting antenna which radiates said transmitting signal output by said transmitter towards said target, conveyor means which transports said target, and rotates it in the transmitting beam formed by said transmitting antenna, a receiving antenna which receives signals reflected by said target, a receiver which receives the signals output by said receiving antenna, and converts them to I/Q (In-Phase Quadrature) video signals by performing orthogonal phase detection, a signal generated by delaying the transmitting signal by the propagation time required for radio waves to travel in both directions between the rotation axis of the target and the receiving antenna being used as a reference signal when orthogonal phase detection is performed, a timing generator which outputs timing signals that vary the transmitting frequency of said transmitting signal to said transmitter, and generates sampling time signals which are delay synchronized with said timing signals, an A/D converter which samples and digitizes said I/Q video signals according to said sampling time signals generated by said timing generator, a first two-dimensional memory which stores said digitized I/Q video signals output by said A/D converter in a sequence determined by a transmission frequency index m assigned according to the sampling times in each signal unit, and a transmission period index n assigned to each signal unit, a range compression device which collects reflected signal components from various ranges present in said digitized I/Q video signals into groups of components having the same range, by performing an inverse Fourier transformation on said digitized I/Q video signals stored in said first two-dimensional memory in the direction of the transmission frequency index for each column having the same transmission period index, and thereby generates video signal data which is resolved in the range direction, a second two-dimensional memory which stores said video signal data resolved in the range direction, in the form of a two-dimensional matrix according to a range index k assigned to the data according to range, and to the transmission period index n, and a cross-range compression device which collects reflected signal components from various directions present in said video signals resolved according to range, into groups of components having the same Doppler frequency, by performing a Fourier transformation on said video signals stored in said second two-dimensional memory in the direction of the transmission frequency index for each row having the same range index, thereby generating video signal data which is resolved in the cross-range direction corresponding to the Doppler frequency, and performs amplitude detection on said video signals so resolved in the cross-range direction so as to generate image data.

7. An apparatus for detecting the shape of a target by means of radar as described in claim 6, wherein said conveyor outputs an angular velocity signal representing the rotation angular velocity of said target, and said apparatus comprises a display which displays an image of said target after converting interval units between picture elements in the cross-range direction of the image data output by said cross-range compression device, into units equivalent to interval units between picture elements in the range direction by using said angular velocity signal.

8. An apparatus for detecting the shape of an object as defined in claim 6, wherein said apparatus further comprises identifying means for identifying a desired target from among various targets successively transported by said conveyor, said identifying means comprising:

- a data base for storing image data for said desired target as reference data, and
- a matching processor for calculating a degree of matching between image data for a target transported by said conveyor and said reference data stored in said data base, and identifying said target transported by said conveyor according to this degree of matching.

9. An apparatus for detecting the shape of an object as defined in claim 6 wherein said conveyor means comprises:

- a suspension type conveyor for suspending and transporting said target,
- a rotating device for rotating said target, and
- a control unit for commanding said suspension type conveyor to stop moving and commanding said rotating device to start rotating when said target has reached a transmitting beam formed by said transmitting antenna.

10. An apparatus for detecting the shape of an object as defined in claim 6, wherein said conveyor means comprises:

- a railway conveyor for transporting said target mounted on a transport platform,
- a rotating lift which lifts said target mounted on said transport platform, and rotates said target,
- a control unit for commanding said railway conveyor to stop moving and commanding said rotating lift to start rotating when said target has reached a transmitting beam formed by said transmitting antenna.

* * * * *